United States Patent [19]
Kobayashi

[11] Patent Number: 5,188,569
[45] Date of Patent: Feb. 23, 1993

[54] MULTIPLE SPROCKET ASSEMBLY FOR BICYCLE

[75] Inventor: Jun Kobayashi, Osaka, Japan

[73] Assignee: Maeda Industries, Ltd., Osaka, Japan

[21] Appl. No.: 843,429

[22] Filed: Feb. 28, 1992

[30] Foreign Application Priority Data

Mar. 29, 1991 [JP] Japan .................. 3-93037

[51] Int. Cl.⁵ .............................. F16H 55/30
[52] U.S. Cl. .................................... 474/160
[58] Field of Search ......... 474/160, 152, 164, 155-157

[56] References Cited

U.S. PATENT DOCUMENTS

| | | | |
|---|---|---|---|
| 3,772,932 | 11/1973 | Nagano | 474/160 |
| 4,259,880 | 4/1981 | Ueno | 474/160 X |
| 4,268,259 | 5/1981 | Segawa et al. | 474/160 |
| 4,889,521 | 12/1989 | Nagano | 474/164 |
| 5,085,621 | 2/1992 | Nagano | 474/160 |

FOREIGN PATENT DOCUMENTS

| | | |
|---|---|---|
| 0313345 | 4/1989 | European Pat. Off. |
| 0417696 | 3/1991 | European Pat. Off. |
| 0429007 | 5/1991 | European Pat. Off. |
| 64-0791 | 3/1989 | Japan |
| 2005778 | 4/1979 | United Kingdom |

*Primary Examiner*—Thuy M. Bui
*Attorney, Agent, or Firm*—Marks & Murase

[57] ABSTRACT

A bicycle multiple sprocket assembly comprises smaller and larger sprockets for shiftable engagement with a chain. The larger sprocket includes first and second easily disengageable chain supporting teeth arranged adjacent to each other, an easily disengageable chain non-supporting tooth immediately following the chain supporting teeth. Each chain supporting tooth has an apex offset away from the smaller sprocket, and a chain supporting portion on its side closer to the smaller sprocket. The entirety of the chain non-supporting tooth is offset away from the smaller sprocket.

9 Claims, 5 Drawing Sheets

MULTIPLE SPROCKET ASSEMBLY FOR BICYCLE

BACKGROUND OF THE INVENTION

1. Field of the Invention

This invention relates to a bicycle multiple sprocket assembly having at least two diametrically different sprockets. More specifically, the invention relates to a multiple sprocket assembly which is designed to provide smooth chain shifting from a larger sprocket to a smaller sprocket.

The term "multiple sprocket assembly" as used herein includes a multiple chainwheel (front gear) which is mounted on a pedal crank assembly, and a multiple freewheel (rear gear) mounted on a rear wheel hub.

2. Description of the Prior Art

Many of currently available bicycles not only have a multiple freewheel to constitute a rear gear mounted on a rear wheel hub, but also incorporate a multiple chainwheel to constitute a front gear mounted on a pedal crank, thereby increasing the number of selectable speeds. A selected sprocket of the front gear is connected to a selected sprocket of the rear gear by an endless chain, and the pedalling force applied to the front gear is transmitted through the chain to the rear gear for driving the bicycle forward.

With a multiple sprocket assembly, a speed change is performed by causing a derailleur (front derailleur or rear derailleur) to laterally press a portion of the chain entering to the sprocket assembly in rotation, which results in that the chain is laterally inclined for shifting from a smaller sprocket to a larger sprocket or vice versa. Obviously, the speed change performance of the sprocket assembly is determined by the smoothness and promptness in disengaging the chain from a presently engaging sprocket for engagement with a target sprocket.

In shifting the chain from a larger sprocket to a smaller sprocket, the chain need only be disengaged from the larger sprocket because a tension applied to the chain can be utilized for causing the chain to automatically fall into engagement with the smaller sprocket. For this reason, it has been hitherto considered easier to shift the chain from the larger sprocket to the smaller sprocket than to shift it from the smaller sprocket to the larger sprocket. Therefore, not much effort has been made to improve chain shiftability from the larger sprocket to the smaller sprocket.

In reality, however, each sprocket of a multiple sprocket assembly has a different number of teeth. Thus, the chain disengaging from the larger sprocket is not necessarily positioned suitably relative to the teeth of the smaller sprocket. In some cases, the chain (chain rollers) may ride on the teeth apexes of the smaller sprocket and move idly through a small angle before completely coming into driving engagement with it. As a result, a large drive force is abruptly applied to the smaller sprocket and the chain, thereby damaging these components. Further, the rider feels a considerable shock at the time of this phenomenon, which sometimes causes danger to the rider.

In view of the above problem, Japanese Utility Model Application Laid-open No. 64-40791 discloses an improved multiple sprocket assembly which is designed so that the chain is made to start shifting from a larger sprocket to a smaller sprocket at a selected angular position of the sprocket assembly. Further, the relative angular position of the smaller and larger sprockets is suitably adjusted so that the chain engages the smaller sprocket without idle movement when the chain starts disengaging at the selected position.

Specifically, the larger sprocket of the above Japanese application comprises an easily disengageable tooth (or a plurality of such teeth) to insure that the chain starts disengaging at this tooth (corresponding to the selected angular position). Further, the smaller and larger sprockets are angularly adjusted so that a tangential line drawn from the furrow center immediately following the easily disengageable tooth to a furrow center of the smaller sprocket has a length which is slightly smaller than np (n: integer number; p: chain pitch). Thus, the chain disengaging from the larger sprocket at the easily disengageable tooth can come immediately into driving engagement with the smaller sprocket teeth without idle movement.

However, the multiple sprocket assembly of the Japanese application is still disadvantageous in the following points.

First, when the chain disengages from the larger sprocket at the easily disengageable tooth, the disengaging chain interferes laterally with the easily disengageable tooth and another tooth immediately following the easily disengageable tooth. Such lateral interference causes the disengaging chain t be laterally inclined or bent to an excessive degree under the tension applied to the chain. Thus, the chain and the larger sprocket are mechanically damaged by repetitive shifting of the chain from the larger sprocket to the smaller sprocket, consequently shortening the life of these components.

Secondly, excessive lateral inclination of the disengaging chain causes it to skip the smaller sprocket, thereby failing to perform intended chain shifting. This problem becomes particularly pronounced when the axial spacing between the smaller and larger sprockets is relatively small.

SUMMARY OF THE INVENTION

It is, therefore, an object of the present invention to provide a bicycle multiple sprocket assembly which provides smooth chain shifting from a larger sprocket to a smaller sprocket without causing excessive lateral inclination or bending of the shifting chain, thereby insuring reliable chain shifting and prolonging the life of the sprocket assembly.

According to the present invention, there is provided a bicycle multiple sprocket assembly comprising at least two adjacent sprockets which include a diametrically smaller sprocket and a diametrically larger sprocket, each sprocket having teeth alternate with furrows for engagement with a chain, each tooth having an apex, each furrow having a bottom; wherein the teeth of the larger sprocket includes a first easily disengageable chain supporting tooth, a second easily disengageable chain supporting tooth immediately following the first chain supporting tooth with respect to a forward rotational direction of the sprocket assembly, and at least one easily disengageable chain non-supporting tooth immediately following the second chain supporting tooth with respect to the forward rotational direction, wherein the apex of each chain supporting tooth is offset away from the smaller sprocket, said each chain supporting tooth having a chain supporting portion on the side thereof closer to the smaller sprocket, the chain supporting portion being located radially inwardly from the apex of said each chain supporting tooth but radially outwardly from the furrow bottom; and wherein the entirety of the chain non-supporting tooth is offset away from the smaller sprocket.

The present invention starts from the knowledge that it is impossible to avoid chain-tooth interference at a portion where the chain starts disengaging from the larger sprocket because the chain is still in driving engagement immediately ahead of the disengagement starting portion. Then, the next choice is to minimize chain-tooth interference in the lateral direction, thereby preventing the disengaging chain from being laterally inclined to a larger degree than is provided by the derailleur.

Based on this idea, the present invention proposes that the disengaging chain be rested directly on the easily disengageable chain supporting teeth themselves, so that the direction of chain-tooth interference is radial rather than lateral. Thus, the disengaging chain is inclined only by the lateral movement of the derailleur but not by the chain-tooth interference, thereby enabling to perform intended chain shifting from the larger to smaller sprockets.

Further, the present invention also proposes that the entirety of the easily disengageable chain non-supporting tooth be offset away from the smaller sprocket. As already described, it is impossible to avoid chain-tooth interference at the disengagement starting portion of the larger sprocket. However, it is possible to prevent chain-tooth interference behind the disengagement starting portion because the chain shifting path becomes progressively farther from the larger sprocket (closer to the smaller sprocket) due to chain inclination. Thus, the chain non-supporting tooth can avoid lateral interference with the disengaging chain by its entire offset away from the smaller sprocket, with the result that unintended lateral inclination of the chain is prevented.

Other objects, features and advantages of the present invention will be clearly understood from the following description of the preferred embodiments given with reference to the accompanying drawings.

DETAILED DESCRIPTION OF THE PREFERRED EMBODIMENTS

Figure 1:
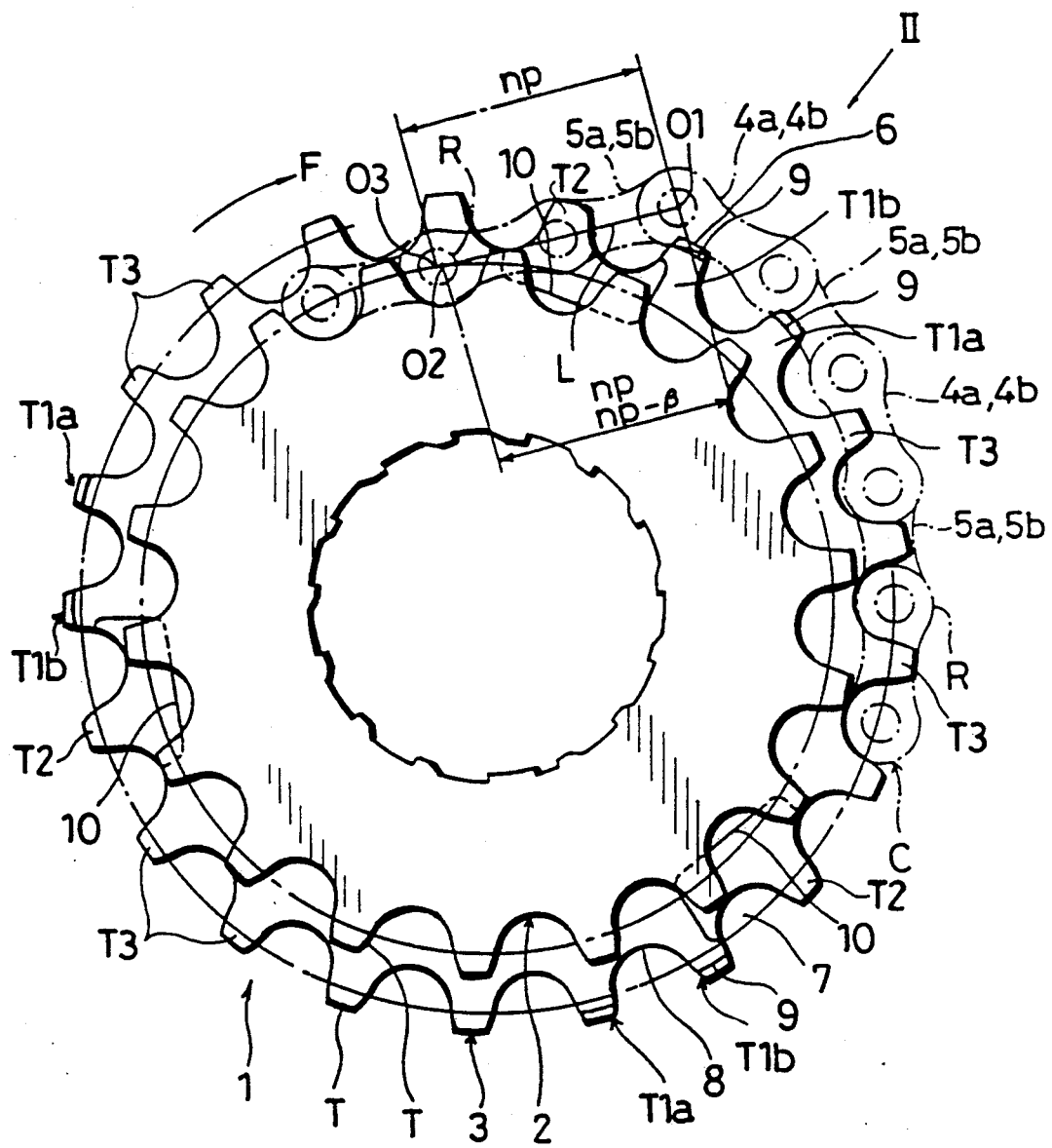
FIG. 1 is a side view showing a multiple sprocket assembly embodying the present invention.

Referring to FIGS. 1 through 6, there is illustrated a multiple freewheel (rear gear) 1 to which the present invention is applied. However, the present invention is equally applicable to a multiple chainwheel (front gear). For simplicity of illustration, the multiple freewheel 1 is shown in FIG. 1 to include a diametrically smaller sprocket 2, and a diametrically larger sprocket 3 arranged laterally of the larger sprocket adjacent thereto. In reality, however, the freewheel of the illustrated embodiment includes a larger number (usually 5 to 8) of diametrically different sprockets, and the present invention is applicable to any two adjacent sprockets of the assembly.

The circumference of each sprocket 2, 3 is formed with teeth T (including specific teeth T1a, T1b, T2, T3 to be described later) arranged at constant pitch which corresponds to the pitch of a chain C. Each tooth T has an apex 6. Furrows 7 are formed between the respective teeth T, and each furrow has a generally arcuate bottom 8.

Figure 2:
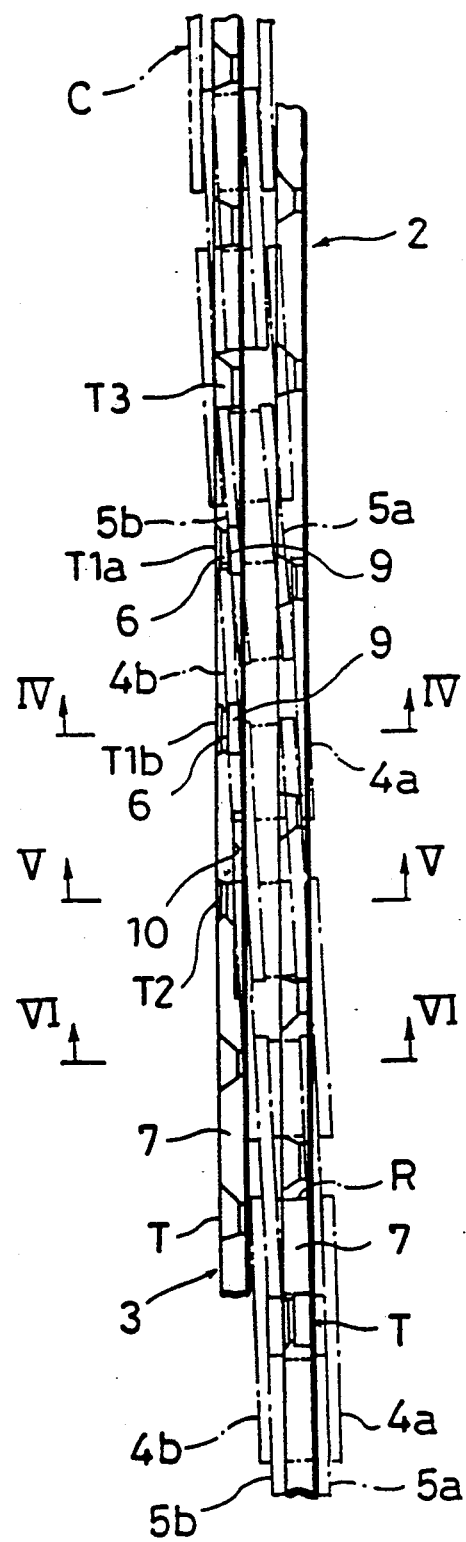
FIGS. 2 and 3 are views of the same sprocket assembly in two different chain shifting conditions as seen in the direction of an arrow II in FIG. 1.

As shown in FIGS. 1 and 2, the chain C includes pairs of outer links 4a, 4b and pairs of inner links 5a, 5b alternate with the outer link pairs. The inner link pairs 5a, 5b are connected to the outer link pairs 4a, 4b by pin rollers R. The rollers R are slightly smaller in curvature than the sprocket furrow bottoms 8. Thus, each sprocket 2, 3 engages with the chain C in a manner such that each chain roller R is received in a furrow 7 between two adjacent sprocket teeth T with a slight play or backlash.

According to the illustrated embodiment, the teeth T of the larger sprocket 3 include three kinds of teeth. A first kind includes three circumferentially spaced groups of easily disengageable chain supporting teeth T1a, T1b (two in each group according to the illustrated embodiment) which are adjacent to each other. A second kind includes three easily disengageable chain non-supporting teeth T2 immediately following the respective groups of chain supporting teeth T1a, T1b with respect to the forward rotational direction (arrow F direction in FIG. 1) of the sprocket assembly 1. A third kind includes reluctantly disengageable teeth T3 constituting the remainder of the larger sprocket teeth.

Figure 4:
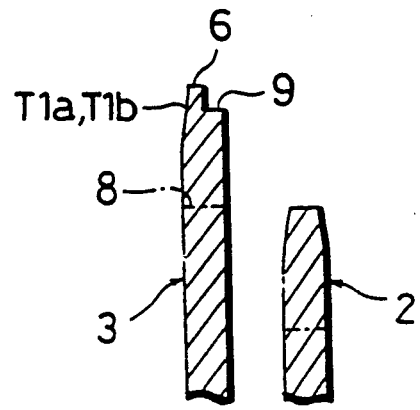
FIG. 4 is a sectional view taken on lines IV—IV in FIG. 2.

As shown in FIG. 4, the apex 6 of each chain supporting tooth T1a, T1b is rendered offset away from the smaller sprocket 2 by partially cutting out the side of that tooth apex portion located closer to the smaller sprocket 2. Such a cutout results in formation of a chain supporting step 9 which is positioned radially inwardly from the tooth apex 6 but radially outwardly from the larger sprocket furrow bottom 8.

Obviously, due to the above-mentioned offset, the chain C engaging the larger sprocket 3 is more likely to disengage at a portion at or near the easily disengageable tooth T1a, T1b. The chain supporting step 9 provides a provisional support for the disengaging chain C, as described hereinafter.

Figure 5:
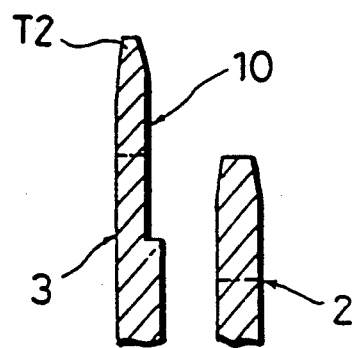
FIG. 5 is a sectional view taken on lines V—V in FIG. 2.

As shown in FIG. 5, each chain non-supporting tooth T2 as a whole is also offset away from the smaller sprocket 2 by forming a depressed portion 10 in the region of the chain non-supporting tooth T2 on the side of the larger sprocket 3 closer to the smaller sprocket 2. The chain non-supporting tooth T2 together with the depressed portion 10 avoids or reduces interference with the chain C at the time of shifting from the larger sprocket 3 to the smaller sprocket 2 (see FIGS. 2 and 3), as described later.

Figure 6:
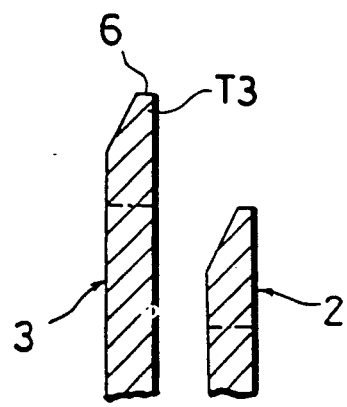
FIG. 6 is a sectional view taken along lines VI—VI in FIG.

As shown in FIG. 6, the apex 6 of each reluctantly disengageable tooth T3 is rendered offset toward the smaller sprocket 2 by chamfering that tooth apex portion on the side thereof away from the smaller sprocket. Obviously, due to such an offset, the chain C engaging the larger sprocket 3 is less likely to disengage at the reluctantly disengageable tooth T3.

In operation for shifting the chain C from the larger sprocket 3 to the smaller sprocket 2, the chain C engaging the larger sprocket 3 is laterally pressed toward the smaller sprocket 2 by the chain guide of an unillustrated rear derailleur. However, since the reluctantly disengageable teeth T3 are made offset toward the smaller sprocket 2, the chain C does not start disengaging at the reluctantly disengageable teeth T3 in spite of lateral pressing. Thus, the chain C starts disengaging only when it reaches a circumferential region of the larger sprocket 3 where the easily disengageable teeth T1a, T1b, T2 are located.

As already described, the chain C comprises alternate pairs of outer links 4a, 4b and inner links 5a, 5b. Obviously, the spacing between the outer link pair is larger than that between the inner link pair. Thus, disengagement of the chain C from the larger sprocket 3 occurs in the following two different modes. For convenience of the following explanation, the easily disengageable chain supporting tooth T1a immediately following the reluctantly disengageable teeth T3 with respect to the forward rotational direction F (see FIG. 1) is referred to as "first chain supporting tooth", whereas the other easily disengageable chain supporting tooth T1b is referred to as "second chain supporting tooth". Further, one link 4b or 5b of each link pair 4a, 4b or 5a, 5b, which is located laterally farther from the smaller sprocket 2, is referred to as "farther link".

In the first shifting mode shown in FIGS. 1 and 2, when an inner link pair 5a, 5b coincides with the first chain supporting tooth T1a, the farther link 5b of the inner link pair rides over the first chain supporting tooth T1a and is stably supported by the chain supporting step 9 of that tooth. Similarly, the farther link 4b of the immediately following outer link pair 4a, 4b rides over the second chain supporting tooth T1b and is stably supported by the chain supporting step 9 of that tooth.

Figure 3:
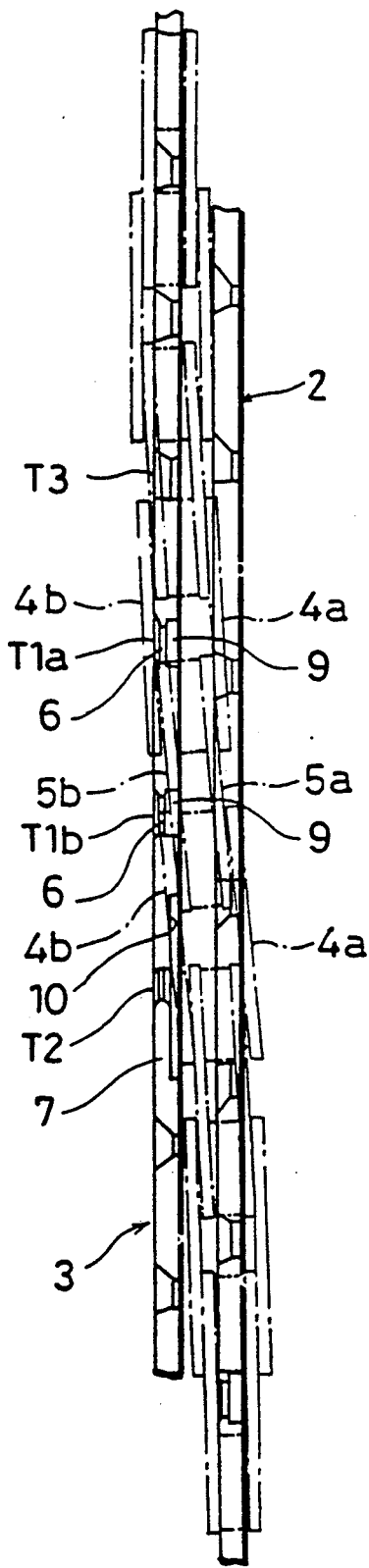

In the second shifting mode shown in FIG. 3, on the other hand, when an outer link pair 4a, 4b coincides with the first chain supporting tooth T1a, the respective links 4a, 4b of the outer link pair ar still located on both sides of the first chain supporting tooth T1a due to the relatively large spacing between the respective links. However, the farther link 5b of the immediately following inner link pair 5a, 5b rides over the second chain supporting tooth T1b and is stably supported by the chain supporting step 9 of that tooth.

Figure 7:
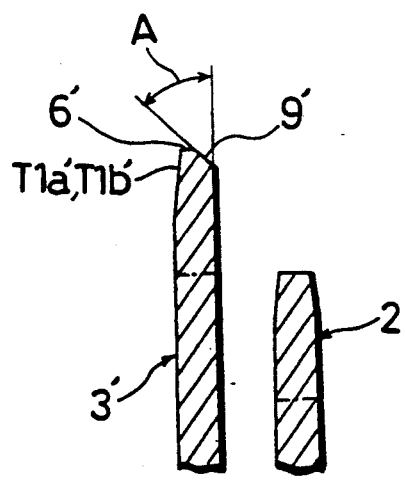
FIG. 7 is a sectional view similar to FIG. 4 but showing another example of larger sprocket embodying the present invention.

Upon further forward rotation of the sprocket assembly 1, the chain C is pulled straight under a tension applied thereto by the unillustrated derailleur and extends substantially tangentially toward the circumference of the smaller sprocket 2 (see FIG. 1). At this time, the chain non-supporting tooth T2 immediately following the second chain supporting tooth T1b does not interfere with the thus disengaging chain C because of its entire offset away from the smaller sprocket 2 by the provision of the depressed portion 10 (FIG. 7).

In either of the first and second shifting modes, the radially inner edge of the chain C is lifted above the furrow bottom 8 of the larger sprocket 3 and stably supported by one or both of the chain supporting steps 9 slightly below the apexes 6 of the first and second chain supporting teeth T1a, T1b. Further, the easily disengageable chain non-supporting toot T2 does not interfere with the disengaging chain C which is under the tension of the unillustrated derailleur. Thus, the chain C is prevented from being laterally bent or inclined to an excessive degree in shifting to the smaller sprocket 2.

According to the prior art, on the other hand, the chain disengaging from a larger sprocket along a tangential path in interferes with the larger sprocket teeth and is therefore bent or inclined to an excessive degree. As a result, the chain may skip the smaller sprocket to fail in shifting from the larger sprocket to the smaller sprocket. Further, undue bending of the chain and objectionable interference thereof with the larger sprocket may result in damage of the chain and/or larger sprocket, consequently shortening the life of these components.

The present invention eliminates or reduces the above problems of the prior art by positively causing the chain C to be lifted and stably supported by the chain supporting steps 9 before transition to the smaller sprocket 2. As a result, the chain shiftability from the larger sprocket 3 to the smaller sprocket 2 is greatly improved, and the life of the chain C and larger sprocket 3 can be increased by decreasing the degree of chain bending or inclination.

In FIG. 1, a substantially tangential line L is drawn from the rear connection center 01 of the link pair 4a, 4b (or 5a, 5b), which is supported by the chain supporting step 9 of the second chain supporting tooth T1b, to a furrow center O2 of the smaller sprocket 2. Preferably, the length of the tangential line L is set equal to np or np-β, where:

p represents the pitch of the chain C, n represents an integer number, and 8 represents a value which is smaller than half the width of each furrow 7 at the pitch circle of the smaller sprocket 2.

As clearly shown in FIG. 2, the chain C is slightly inclined laterally in shifting from the larger sprocket 3 to the smaller sprocket 2 because these two sprockets are not in the same plane. Thus, by properly adjusting β in np-β, it is possible to make a connection center O3 of the chain C coincide exactly with the furrow center O2 of the smaller sprocket 2. However, because the lateral inclination of the chain C is relatively small and because the chain roller R is slightly smaller in curvature than the furrow bottom 8, a particular roller R providing the connection center O3 may be properly received in a particular furrow 7 providing the furrow center O2 even if the length of the tangential line L is equal to np. In this way, it is possible to avoid a situation in which the chain C moves idly relative to the smaller sprocket 2 before completely coming into driving engagement therewith.

In the illustrated embodiment, the larger sprocket 3 is shown to have three groups of first and second easily disengageable chain supporting teeth T1a, T1b. Thus, the chain C may start disengaging at any of the three groups, and three similar tangential lines L may be drawn. However, these three tangential lines L are not necessarily equal in length because the teeth positional relation between the smaller and larger sprockets 2, 3 differ angularly.

To more specifically explain this, it is now assumed that the smaller sprocket 2 has twenty seven (27) teeth while the larger sprocket 3 has thirty (30) teeth. In this case, the greatest common divisor for the larger sprocket teeth number and the smaller sprocket teeth number is three (3), and the teeth positional relation between the smaller and larger sprockets 2, 3 returns to the same condition at every 120° (every nine teeth for the smaller sprocket 2 and every ten teeth for the larger sprocket 3). Thus, the three tangential lines L may be rendered equal in length in this case.

On the other hand, if the smaller sprocket 2 has twenty seven (27) teeth while the larger sprocket 3 has thirty one (31) teeth, there is no common divisor other than unity (1) for the respective teeth numbers of the smaller and larger sprockets 2, 3. Thus, the three tangential lines L differ slightly in length from each other. Indeed, a similar situation also occurs with respect to any combination of two diametrically different sprockets wherein there is no common divisor other than unity for the respective teeth numbers of the two sprockets.

Even in the latter case described above, the difference in length of the respective tangential lines L can be kept smaller than half the pitch circle width of each tooth furrow 7. In other words, the length of the respective tangential lines L may be set either np or np-$\beta$, so that the chain C may be made to disengage smoothly at the respective angular positions of the sprocket assembly 1.

FIG. 7 shows another example of larger sprocket 3' wherein each easily disengageable chain supporting tooth T1a', T1b' has an apex 6' and a chain supporting face 9' which is formed by chamfering the tooth apex portion on the side thereof closer to the smaller sprocket 2. Preferably, the chamfer angle A for the chain supporting face 9' is set no less than 35°, particularly 35°-50°, for stably supporting the chain below the tooth apex 6' but above the furrow bottom.

The present invention being thus described, it is obvious that the same may be varied in many ways. Such variations are not to be regarded as a departure from the spirit and scope of the invention, and all such modifications as would be obvious to those skilled in the art are intended to be included within the scope of the following claims.

I claim:

1. A bicycle multiple sprocket assembly comprising at least two adjacent sprockets which include a diametrically smaller sprocket and a diametrically larger sprocket, each sprocket having teeth alternate with furrows for engagement with a chain, each tooth having an apex, each furrow having a bottom;
   wherein the teeth of the larger sprocket includes a first easily disengageable chain supporting tooth, a second easily disengageable chain supporting tooth immediately following the first chain supporting tooth with respect to a forward rotational direction of the sprocket assembly, and at least one easily disengageable chain non-supporting tooth immediately following the second chain supporting tooth with respect to the forward rotational direction,
   wherein the apex of each chain supporting tooth is offset away from the smaller sprocket, said each chain supporting tooth having a chain supporting portion on the side thereof closer to the smaller sprocket, the chain supporting portion being located radially inwardly from the apex of said each chain supporting tooth but radially outwardly from the furrow bottom; and
   wherein the entirety of the chain non-supporting tooth is offset away from the smaller sprocket.

2. The sprocket assembly according to claim 1, wherein the chain supporting portion of said each chain supporting tooth is in the form of a chain supporting step.

3. The sprocket assembly according to claim 2, wherein the chain supporting step is formed by partially cutting out an apex portion of said each chain supporting tooth on the side thereof closer to the smaller sprocket.

4. The sprocket assembly according to claim 1, wherein the chain supporting portion of said each chain supporting tooth is in the form of an inclined chain supporting face.

5. The sprocket assembly according to claim 4, wherein the inclined chain supporting face is formed by chamfering a tooth apex portion of said each chain supporting tooth on the side thereof closer to the smaller sprocket.

6. The sprocket assembly according to claim 5, wherein the inclined chain supporting face has an angle of no less than 35°.

7. The sprocket assembly according to claim 1, wherein the chain non-supporting tooth is rendered offset away from the smaller sprocket by forming a depressed portion in a region containing the chain non-supporting tooth on the side of the larger sprocket closer to the smaller sprocket.

8. The sprocket assembly according to claim 1, wherein at least one tooth of the larger sprocket immediately preceding the first chain supporting tooth with respect to the forward rotational direction has its apex offset toward the smaller sprocket.

9. The sprocket assembly according to claim wherein the chain has a link connection center raised above the chain supporting portion of the second chain supporting tooth at the time of shifting from the larger sprocket to the smaller sprocket, the chain taking a substantially tangential shifting path extending from said link connection center toward a furrow center of the smaller sprocket, the chain shifting path having a length which is equal to np or np-$\beta$, where
   p represents pitch of the chain,
   n represents an integer number, and
   represents a value which is smaller than half the width of the furrow at the pitch circle of the smaller sprocket.

* * * * *